L. D. HARVEY.
GAGE FOR TEACHING PENMANSHIP.

No. 177,120. Patented May 9, 1876.

WITNESSES:
John Goethals
Alex F. Roberts

INVENTOR:
L. D. Harvey
BY
ATTORNEYS.

UNITED STATES PATENT OFFICE.

LORENZO DOW HARVEY, OF SHEBOYGAN, WISCONSIN.

IMPROVEMENT IN GAGES FOR TEACHING PENMANSHIP.

Specification forming part of Letters Patent No. 177,120, dated May 9, 1876; application filed March 6, 1876.

*To all whom it may concern:*

Figure 1:
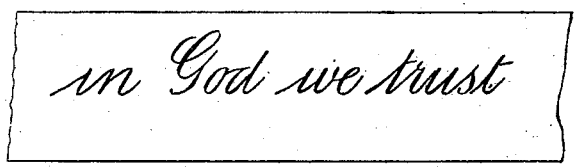
Figure 2:
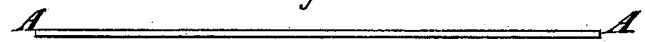
Figure 3:
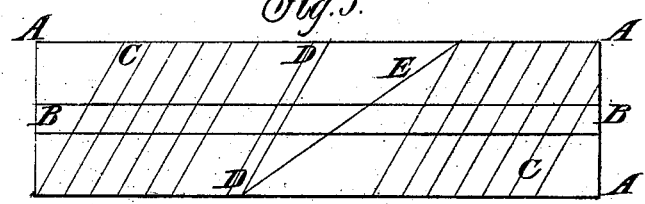
Figure 4:
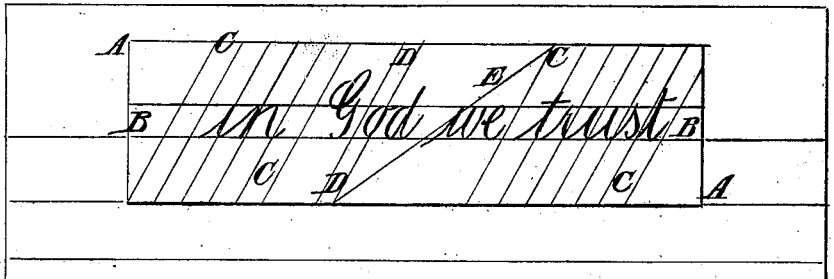

Be it known that I, L. DOW HARVEY, of Sheboygan, in the county of Sheboygan and State of Wisconsin, have invented a new and useful Improvement in Gage for Testing Penmanship, of which the following is a specification:

Figure 1 represents a specimen of penmanship to be tested. Fig. 2 is an edge view of the gage. Fig. 3 is a face view of the same. Fig. 4 is a view illustrating the use of the gage.

Similar letters of reference indicate corresponding parts.

This invention has for its object to furnish, and consists in, a gage made of glass, gelatine, horn, or other transparent, semi-transparent, or translucent substance, having lines cut, scratched, etched, or otherwise represented upon it in such a manner that it may be used for measuring the length, width, slant, and spacing of letters and figures in writing, as hereinafter fully described.

A represents the gage, which is made of glass, gelatine, horn, or other suitable transparent, semi-transparent, or translucent substance that will allow the letters to be seen through it. The gage A has two parallel lines, B, formed longitudinally upon it, at a distance apart equal to the unit of measurement for the lengths of the letters of the system of penmanship used, and at a distance from the edges of the gage equal to two spaces, the entire width of the gage being thus five spaces, or equal to the length of the longest letters. At each end of the gage A are formed a number of parallel lines, C, at a distance apart equal to one space or unit for measuring the width of the letters, and at a slant equal to the slant of the letters. In the middle part of the gage A are formed two parallel lines, D, at a distance apart equal to half a width space, and of the same slant as the lines C. In the middle part of the gage A is formed a single inclined line, E, for measuring the connecting slant.

For the Spencerine system of penmanship the lines C D should be at an angle of about fifty-two degrees, (52°,) and the line E should be at an angle of about thirty degrees, (30°.)

In using the gage A it is applied to the copy, and is then applied to the scholar's own writing, and enables him to see his errors, and thus enables him to correct them much sooner than would be possible by a simple inspection of the copy.

Having thus described my invention, I claim as new and desire to secure by Letters Patent—

The writing-gage herein described, consisting of a transparent plate, A, having the horizontal lines B, and the inclined or slanting lines C D E, as and for the purpose set forth.

LORENZO DOW HARVEY.

Witnesses:
WM. H. SEAMAN,
J. W. BENTLEY.